UNITED STATES PATENT OFFICE.

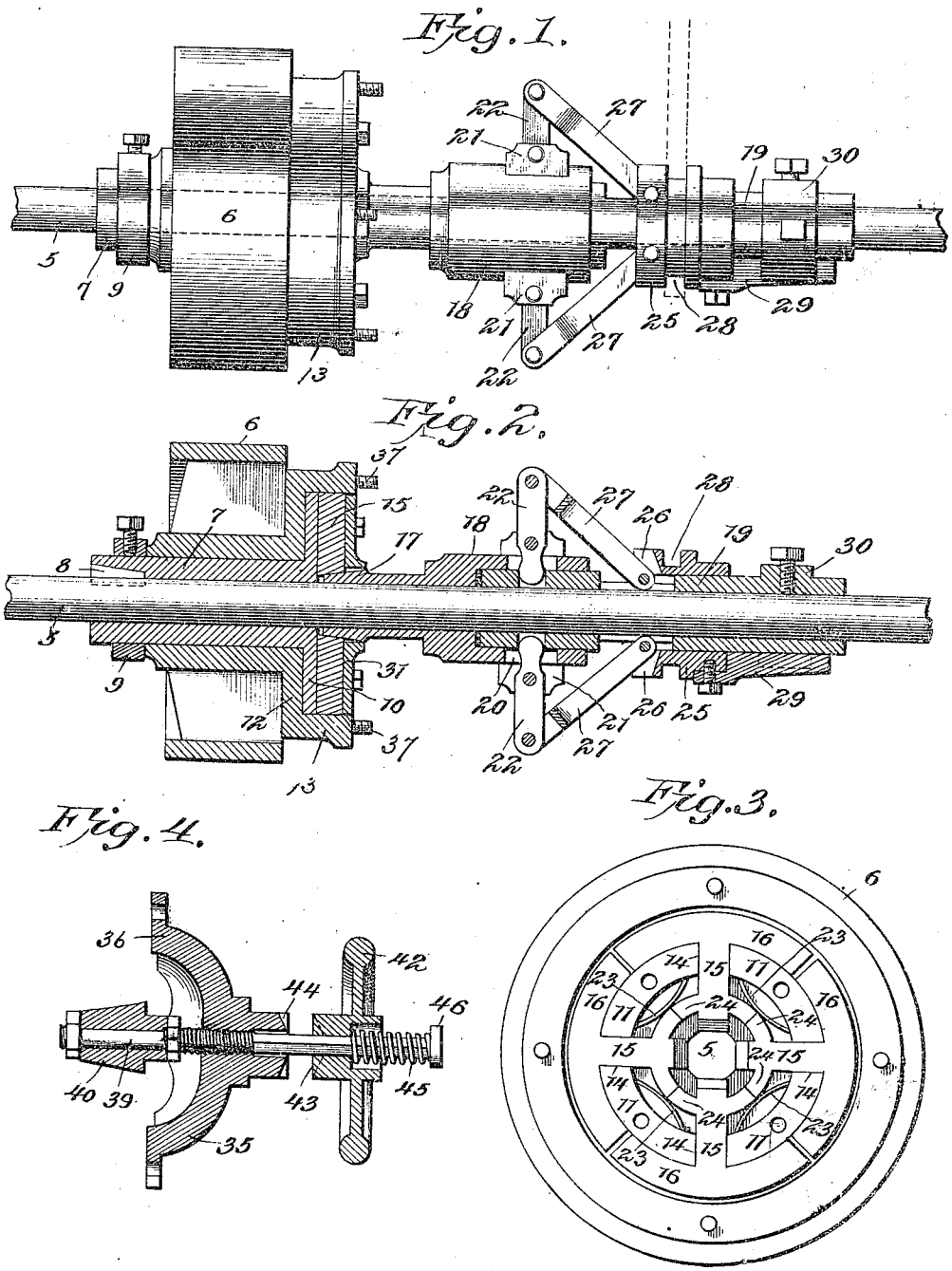

HERMAN MOON AND DUWARD McMURREN, OF GROVE CITY, PENNSYLVANIA.

CLUTCH.

SPECIFICATION forming part of Letters Patent No. 659,349, dated October 9, 1900.

Application filed June 1, 1900. Serial No. 18,769. (No model.)

*To all whom it may concern:*

Be it known that we, HERMAN MOON and DUWARD MCMURREN, citizens of the United States, residing at Grove City, in the county of Mercer and State of Pennsylvania, have invented a new and useful Clutch, of which the following is a specification.

This invention relates to clutches in general, and more particularly to the class of friction-clutches; and it has specific reference to clutches designed for clutching a normally-idle pulley to a rotatable shaft when it is desired to cause the pulley to rotate with the shaft.

In the drawings forming a portion of this specification, and in which like numerals of reference indicate similar parts in the several views, Figure 1 is a side elevation showing the complete clutch mechanism mounted upon a shaft. Fig. 2 is a central longitudinal section of the clutch mechanism and showing the shaft and parts of the mechanism in elevation. Fig. 3 is an end elevation of the clutch proper with the face-plate removed to show the relative arrangements of the engaging members. Fig. 4 is a longitudinal section of a modified form of clutch-operating mechanism.

Referring now to the drawings, and more particularly to Figs. 1, 2, and 3 thereof, 5 represents a power-shaft upon which is loosely mounted an idler or loose pulley 6, said pulley being directly mounted upon a sleeve 7, which is in turn fixed to the shaft 5 by means of a key 8, as shown, the loose pulley being held from displacement longitudinally from the sleeve in one direction by means of a collar 9, which is removably mounted upon the sleeve. At the opposite end of the sleeve 7 is formed a web 10, which is disk-shaped and from the outer face of which projects an annular flange 11, the functions of which will be presently explained. At that end of the hub of the pulley 6 adjacent to the web 10 and between said web and the rim of the pulley there is formed a disk-shaped web 12, which lies against the rear face of web 10 and which is provided with an annular flange 13 on its outer face, which flange encircles the flange 11 of disk 10 and projects slightly beyond it.

The inner face of flange 13 forms one clutch-face, the opposing clutch-faces being upon members movably mounted in the flange 11. The flange 11 is provided with four equidistant radial slots 14, and in these slots are slidably disposed the stems 15 of segmental clutch members 16, said members 16 lying between the adjacent faces of the flanges 11 and 13. Thus if the inner ends of the stems 15 be engaged to move them outwardly the clutch faces of the movable members will be brought into frictional engagement with the inner face of flange 11 and the pulley will be frictionally held to rotate with the sleeve 7. To effect this longitudinal movement of the stems 15, the inner ends thereof are beveled on their outer faces for engagement by a wedge 17, which has four converging faces. In the drawings this wedge 17 is in the form of a sleeve, which is slidably mounted on the shaft and which has an enlarged outer end 18, the internal diameter of which is increased to an extent sufficient to fit slidably over a sleeve 19, which is fixed upon the shaft. The sleeve portion 18 has longitudinal slots 20 therein, and on opposite sides of these slots are ears 21, in which are pivotally mounted levers 22, the inner ends of which are extended to lie in recesses in sleeve 19, so that as the outer ends of the levers are operated the sleeve 18 will be reciprocated and the wedge will be moved toward and away from the movable clutch members to spread them and release them alternately. When the clutch members are released, they are moved out of clutching position by means of bow-springs 23, which are disposed with their ends against the inner faces of the segmental sections of flange 11, the central portions of the springs resting against blocks 24 upon the inner ends of the stems 15 of the clutch members 16.

In order to operate the levers 22, a collar 25 is slidably mounted on sleeve 19, and in slots 26 at one end thereof are pivoted the ends of links 27, the outer ends of said links being bifurcated to pivotally receive the outer ends of the levers. The collar 25 has the usual peripheral groove 28 to receive the yoke of a shifting lever (not shown) and is prevented from rotatable displacement upon the sleeve 19 by means of a finger 29, which is fixed thereto and is adapted to slide in a groove in a flange 30 upon sleeve 19. Thus by moving the collar 25 in one direction the pulley 6 is clutched to rotate with the shaft, and by moving it in an opposite direction the pulley is loosened. As shown in Figs. 1 and 2, the movable members of the clutch—that is, the parts within the inclosure of flange 13—are covered by a plate 31, which is screwed onto the flange 11 and fits into the inclosure of flange 13.

In Fig. 4 of the drawings there is shown a different form of mechanism for operating the wedge which spreads the movable members of the clutch, and this device is adapted for use upon the end of a shaft. It consists of a cap 35, which may be of skeleton formation, and comprises a flange 36, which is perforated to receive attaching-bolts 37 upon the rear edge of the flange 13, flange 36 being held on the bolts by clamping-nuts. The cap 35 has a threaded perforation disposed to aline axially with the shaft 5, and with these threads is engaged a screw-shaft 39, at the inner end of which is rotatably mounted a wedge 40, corresponding to the wedge above referred to, and which wedge is adapted to engage and move the stems 15 of the movable clutch members. The outer end of shaft 39 is angular in cross-section and has mounted thereon a hand-wheel 42, which is adapted for slidable movement. On one end of the hub of the hand-wheel is formed a clutch member consisting of a series of teeth 43, and upon the outer end of the cap 35 are corresponding teeth 44, the hand-wheel being held normally and yieldably in position to engage the teeth by means of a helical spring 45, which encircles the outer end of the screw-shaft and bears at its ends against the outer face of the hand-wheel and against the stop 46 at the end of the shaft. Thus the hand-wheel will be normally held with its teeth against the teeth of the cap to prevent adjustment of the wedge, and by drawing the hand-wheel rearwardly the teeth will be disengaged and the hand-wheel may be rotated to adjust the wedge.

In practice various modifications of the invention may be made and any suitable materials and proportions may be used for the various parts without departing from the spirit of the invention.

What is claimed is—

1. In a clutch mechanism, the combination with a sleeve having a flanged web, said flange having slots therethrough of a pulley disposed loosely on the sleeve and provided with a flange which encircles the flange of the web, clutch members having stems slidably engaged with the slots and having segmental heads lying between the flanges, the inner ends of the stems being beveled, arc-shaped stop-blocks upon the stems, bow-springs disposed with their ends against the web-flange and each with its bow against the ends of mutually-adjacent stop-blocks to hold the members normally retracted with the ends of the blocks in contact to hold the beveled ends of the stems spaced, and means for engagement with the beveled portions of the members to move them radially.

2. In a clutch mechanism, the combination with coöperating clutch-faces and their carrying members, of a reciprocatory sleeve adapted for engagement with one member to operate it, said sleeve having slots therein, a second sleeve projecting into the first sleeve and adapted for attachment fixedly with a shaft the second sleeve having recesses therein, levers pivoted to the first sleeve and engaging the recesses of the second sleeve, a collar on the second sleeve and having link connections with the levers, a finger upon the collar slidably engaged with the second sleeve to prevent rotation with respect thereto, and means for reciprocating the collar.

In testimony that we claim the foregoing as our own we have hereto affixed our signatures in the presence of two witnesses.

HERMAN MOON.
DUWARD McMURREN.

Witnesses:
C. F. LAWRENCE,
JAS. L. LAWRENCE.